United States Patent [19]

Hungerford, Jr. et al.

[11] 3,722,341
[45] Mar. 27, 1973

[54] KEY CUTTER

[75] Inventors: Philip C. Hungerford, Jr., Cleveland; Robert H. Richens, Bedford Heights; John L. Gereby, Wickliffe, all of Ohio

[73] Assignee: Cole National Corporation

[22] Filed: Jan. 18, 1971

[21] Appl. No.: 107,311

[52] U.S. Cl. ...................83/413, 83/414, 83/917, 30/131, 90/13.05
[51] Int. Cl. ..............................................B26d 7/06
[58] Field of Search .......90/13.05; 83/917, 413, 414; 30/131; 76/110

[56] References Cited

UNITED STATES PATENTS

| | | | |
|---|---|---|---|
| 3,496,636 | 2/1970 | Lieptz | 83/917 X |
| 3,486,226 | 12/1969 | Reisner | 83/917 X |
| 3,469,498 | 9/1969 | Adler et al. | 90/13.05 |
| 1,889,461 | 11/1932 | Hansen | 90/13.05 |
| 2,731,087 | 1/1956 | Cole | 83/917 X |

Primary Examiner—Gil Weidenfeld
Attorney—Woodling, Krost, Granger & Rust

[57] ABSTRACT

A key cutter is disclosed which is a hand-actuated machine adapted to cut key blanks in accordance with a preset manufacturer's code which sets the depth of cut of each notch and the longitudinal spacing between successive notches. Alternatively, the key cutter may be used as a duplicator to cut a blank key in accordance with a master key. This duplicating function is aided by a parallelogram vise assembly which carries both the blank key and the master key. The key cutting machine automatically indexes to the next successive longitudinal position for key notch cutting with each actuation of the cutter actuating machine and the entire machine may be reset to perform the next cycle of operation by moving the carriage in a single direction. This resets both the depth setting means and the cut spacing means. The foregoing abstract is merely a resume of one general application, is not a complete discussion of all principles of operation or applications, and is not to be construed as a limitation on the scope of the claimed subject matter.

37 Claims, 6 Drawing Figures

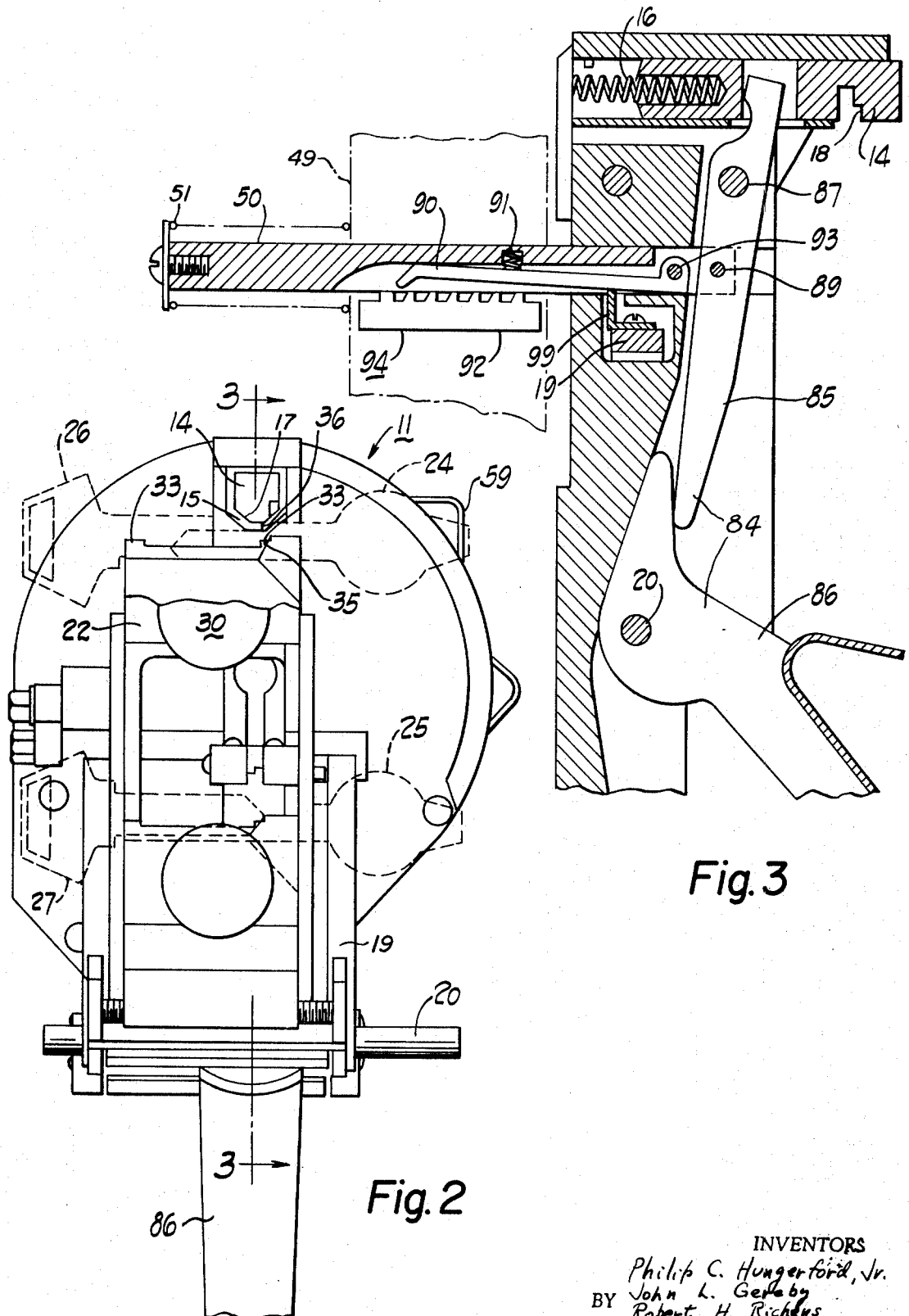

INVENTORS
Philip C. Hungerford, Jr.
John L. Geweke
BY Robert H. Richens

Woodling, Krost, Granger and Rust
ATTORNEYS.

KEY CUTTER

BACKGROUND OF THE INVENTION

Key cutting machines have often taken the form of bench models wherein a master key or owner's key is duplicated by having a stylus follow the master key and a rotating cutter wheel has similar movements to duplicate that form on a blank key. Another form of prior art key cutting machine is a code cutting machine which cuts a key, not in accordance with a master, but in accordance with some predetermined code as established by a manufacturer. The automotive companies for ignition and trunk keys are examples of this type of coded key cutting machine. Depending upon a code numeral from one to five, for example, different depths, in 0.020 or 0.025 inch depth increments are set in the machine and the notches in the key are cut at the prescribed depth. The cutting is often by a laterally moving punch and anvil and the notch cutting is usually done in sequence along the length of the key. One difficulty with these coded key cutting machines is that each manufacturer has its own code with different increments of depth for each sequential code number, has different total numbers of increments making up the depth of the notch, and has different longitudinal spacing between the sequence of notches along the length of the key as well as having a different number of notches along the length of the key. As a result, many prior art code key cutters required a number of separate templates, one for each manufacturer, and often many different ones for a single manufacturer in order to set up the number of notches and the longitudinal spacing of such notches. Also, the separate templates were small items subject to becoming easily lost in which the code cutter was unusable until the replacement was reordered and obtained. Further with very many different kinds of templates, it was easy to make a mistake in using the wrong template or in improperly inserting the template in the machine.

Accordingly, an object of the invention is to provide a key cutting machine obviating the above-mentioned disadvantages.

Another object of the invention is to provide a self-contained hand-held code-controlled key-cutting machine.

Another object of the invention is to provide a hand-held code controlled key-cutter which automatically indexes along the length of the key with each cut of a notch.

Another object of the invention is to provide a hand operated code key-cutter wherein all functions are connected to the actuation of a lever handle, the stepping longitudinal index and the relative lateral movement of the key and cutter to select the depth of cut.

Another object of the invention is to provide a code key cutter with a reset means to reset the mechanism to the start position by moving a handle in a single direction.

Another object of the invention is to provide a hand-operated key cutter with a parallelogram vise assembly which maintains a constant planar attitude of the blank key relative to the key cutter regardless of the depth of cut.

Another object of the invention is to provide a hand-operated key cutter with a parallelogram vise assembly which holds both a blank key and a master key from which the shape may be copied onto the blank key.

SUMMARY OF THE INVENTION

The invention may be incorporated in a machine for cutting key blanks, comprising, in combination, a frame, a cutter, an indexable carriage movably mounted on said frame, vise means adapted to hold key means, said key means including a blank key for operation thereon by said cutter and having a longitudinal axis, means mounting said cutter and said vise means on said carriage and said frame for relative longitudinal movement, cut spacing means acting between said carriage and said frame to establish the spacing of successive cuts along the length of the blank key, said cut spacing means including a plurality of spacing walls cooperable between said carriage and said frame, cut actuating means to actuate relatively said cutter and said vise means to cut a notch in a blank key, and indexing means responsive to movement of said cut actuating means to index said carriage to the next selected spacing wall.

Other objects and a fuller understanding of the invention may be had by referring to the following description and claims, taken in conjunction with the accompanying drawing.

BRIEF DESCRIPTION OF THE DRAWING

FIG. 2 is a front view showing the machine in the start position of FIG. 1;

FIG. 3 is a partial sectional view taken on line 3—3 of FIG. 2;

DESCRIPTION OF THE PREFERRED EMBODIMENT

Figure 1:
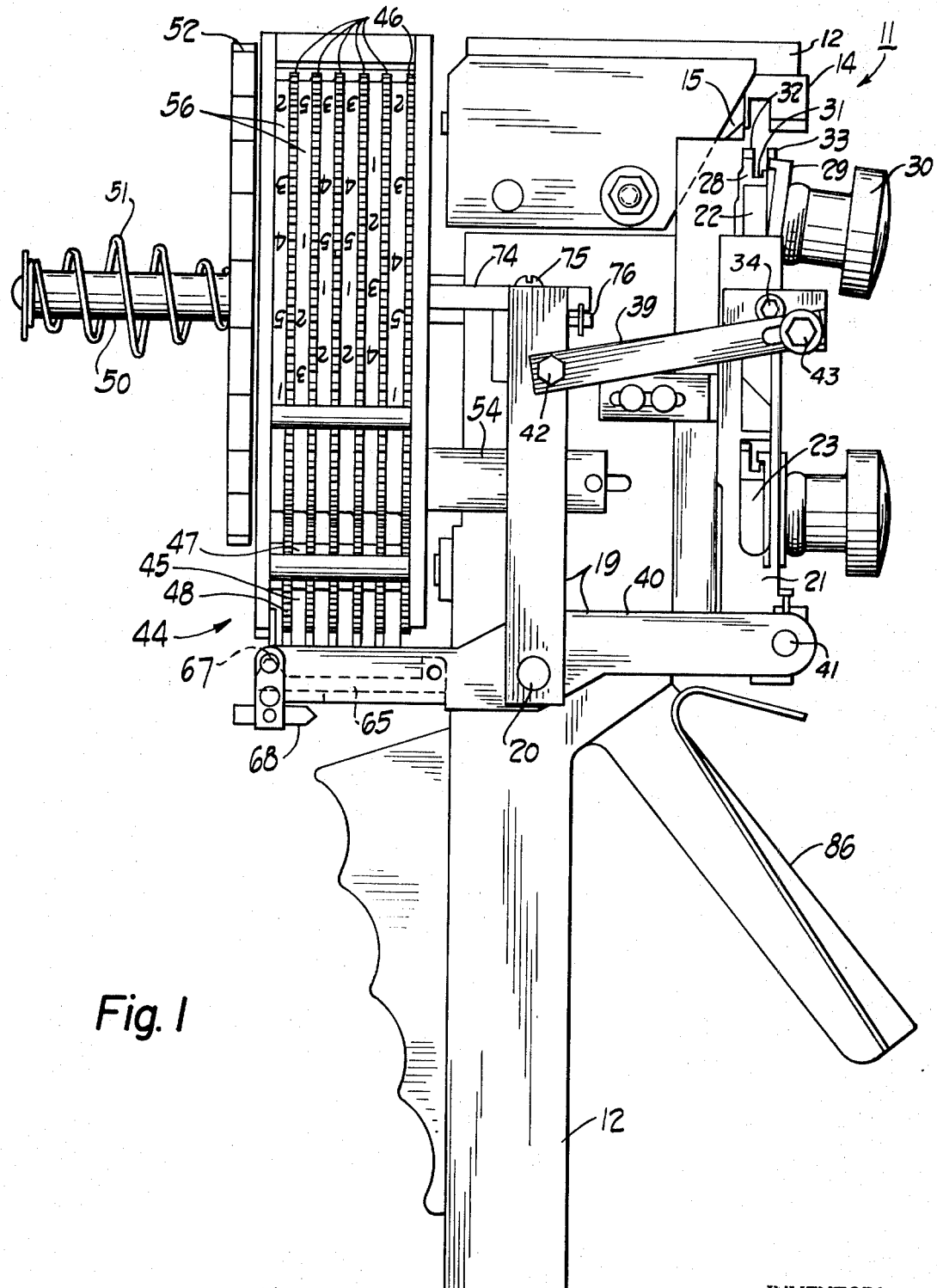
FIG. 1 is a left side elevational view of the preferred embodiment of the invention.

The figures of the drawing show a key cutting machine 11 which illustrates the preferred embodiment. This machine 11 has a frame 12 which may rest on a base 13 for convenience and the frame 12 is generally an upright column. A cutter 14 is mounted on the frame 12 and this cutter takes the form of a punch cooperating with an anvil 15. The anvil 15 is fixed on the frame 12 and the punch 14 reciprocates on a horizontal axis and is urged outwardly to an open position by a punch spring 16.

Figure 6:
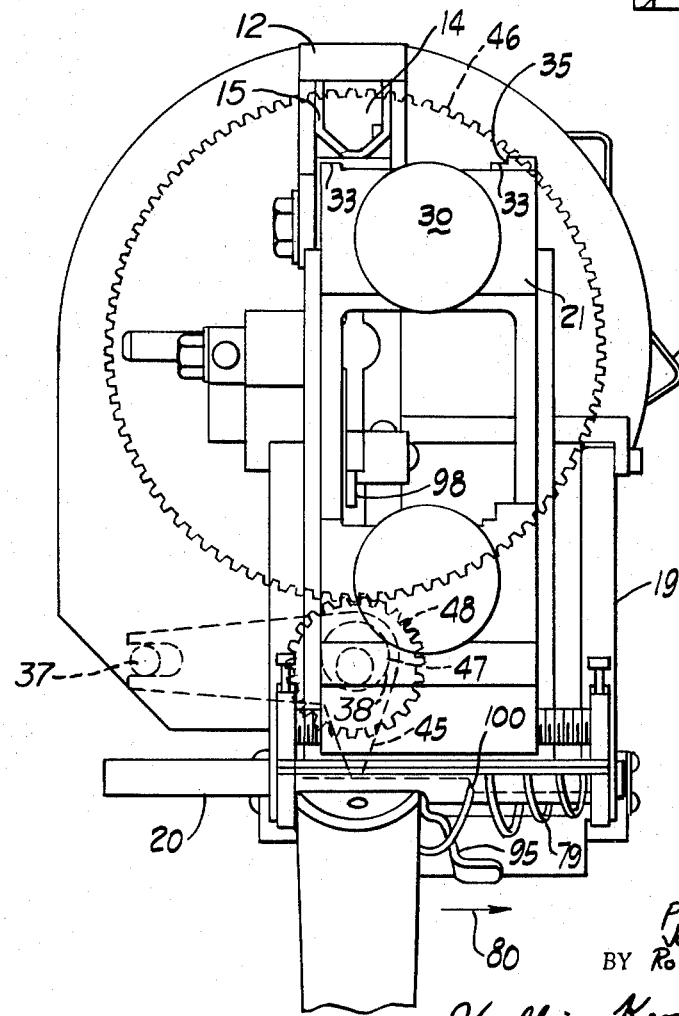

A carriage 19 is movably mounted on the frame 12. The frame 12 carries a fixed pivot axle 20 on which this carriage 19 is pivotally and axially slidably mounted, compare FIGS. 2 and 6, showing start and finish positions, respectively, of carriage 19. Vise means 21 is carried on this carriage 19 and this vise means includes a first vise 22 and a second vise 23. The first vise 22 is adapted to hold a blank key 24 shown in phantom in FIG. 2 and the second vise 23 is adapted to hold a master key 25, also shown in phantom in FIG. 2. The vises 22 and 23 are similar in construction and only vise 22 will be described in detail. This vise has a fixed jaw 28 and a movable jaw 29 pivoted thereto at 34. A knob 30 rotates a screw, not shown, for tightening the movable jaw 29 against the fixed jaw 28. The key 24 shown in FIG. 2 is a single-sided key having a smooth rear edge which is adapted to engage a lower gauge surface 31 to establish the lateral position of the key 24 relative to the punch 14. Also shown in phantom in FIG. 2 is a key blank 26 and a master key 27 which are double-sided keys inserted from the opposite side of the vise. Such keys have an intermediate longitudinal rib from which the key is gauged laterally and this rib rests on the upper gauge surface 32 on the fixed jaw 28 or alternatively, on the upper gauge surface 33 on the movable jaw 29. By this means the lateral position of any key may be gauged and precisely held in the vise means 21. As better shown in FIG. 2, these upper gauge surfaces 32 and 33 lie only at the two outer ends of the vise face and the vise is cut away in between these two gauge surfaces to permit a maximum depth of cut by the punch 14. An end stop 35 provides a length gauge for double-sided keys and a shoulder 36 provides a length gauge for the shoulder of the single-sided keys 24. By this means the proper longitudinal position of either single or double-sided keys in the vise relative to the punch 14 is assured. The punch 14 slides within and is closely received within an aperture 17 in the anvil 15 so that when the jaw 18 of the punch 14 is reciprocated against the front face of the anvil 15 it will cut a notch in the blank key 24 or 26.

The carriage 19 carries the vise means 21 by means of parallelogram linkage 39 and 40. The linkage arm 40 is pivoted on the pivot axle 20 and and is pivoted at 41 to the vise means 21. The linkage arm 39 is pivoted at 42 to the machine frame 12 and pivoted at 43 to the vise means 21. By this parallelogram linkage 39, 40 the vise means 21 always maintains the same planar attitude relative to the punch 41 regardless of the depth of cut on the blank key 24 or 26. In other words the blank key always remains in a vertical plane even though the vise means 21 raises and lowers to change the depth of cut.

Depth setting means 44 is provided to establish the depth of cut of the cutter 14 laterally on the blank key 24, 26. This depth setting means 44 includes a plurality of depth gauges 45 which may be considered positioning dogs movable vertically. A total of six such depth gauges are provided to establish a maximum of six variable depth notches along the length of the blank key 24 or 26. A plurality of gears 46 are provided to rotate individual cams 47 which set the vertical height of the depth gauges 45. These gears 46 accomplish this by means of individual pinions 48 meshing with the individual gears 46 and fixed to the cams 47. Each depth gauge 45 is in the form of a lever pivoted at 37. The respective cam 47 is circular but eccentrically mounted on the shaft of pinions 48. Each cam fits within a circular aperture 38 in the respective depth gauge 45. Accordingly, as each pinion 48 and associated cam 47 is rotated 180° from the position shown in FIG. 6, this causes a maximum downward movement of the corresponding depth gauge 45. These gears 46 are hollow and rotatively mounted in a drum 49, held non-rotating by a guide 54. The drum is axially movable along a shaft 50 carried in the frame 12. This shaft 50 is axially movable as explained below. A drum spring 51 urges the drum 49 toward the frame 12. The drum spring 51 may also be called an indexing spring to urge the drum 49 in an indexing direction. A scalloped wheel 52 rotates on the shaft 50 adjacent the drum 49 and has a longitudinal pin 53 engaged in a sector aperture in each of the gears 46. In this preferred embodiment there are eight sectors on each of the gears 46 so the pin 53 causes all gears to rotate together among sectors when the scalloped wheel 52 is rotated. With eight sectors, each sector aperture is about 45° of arc, so that each gear 46 may be individually adjusted for the proper code setting, see below, once a sector has been selected. A gauge ring 56 is attached to each of the gears 46 and indicia 57 appears at a window 58. Spring fingers 59 in the drum 49 may be depressed so that an end of each spring finger engages the teeth of the gears 46 for individual rotation of such gears. By this means a code may be set as indicated by the indicia 57 appearing at the window 58, for example, an automobile manufacturer makes millions of keys each year each according to a preset code. Each manufacturer has different specifications for each code and the code indicates the depth of each of the several notches along the axial length of the key. Seven of the eight sectors on each gear 46, and the corresponding gauge ring 56, permit such depth setting means 44 to be set in accordance with each manufacturer's code for that particular key to be cut. The eighth sector is used for key copying, as described below.

Figure 5:
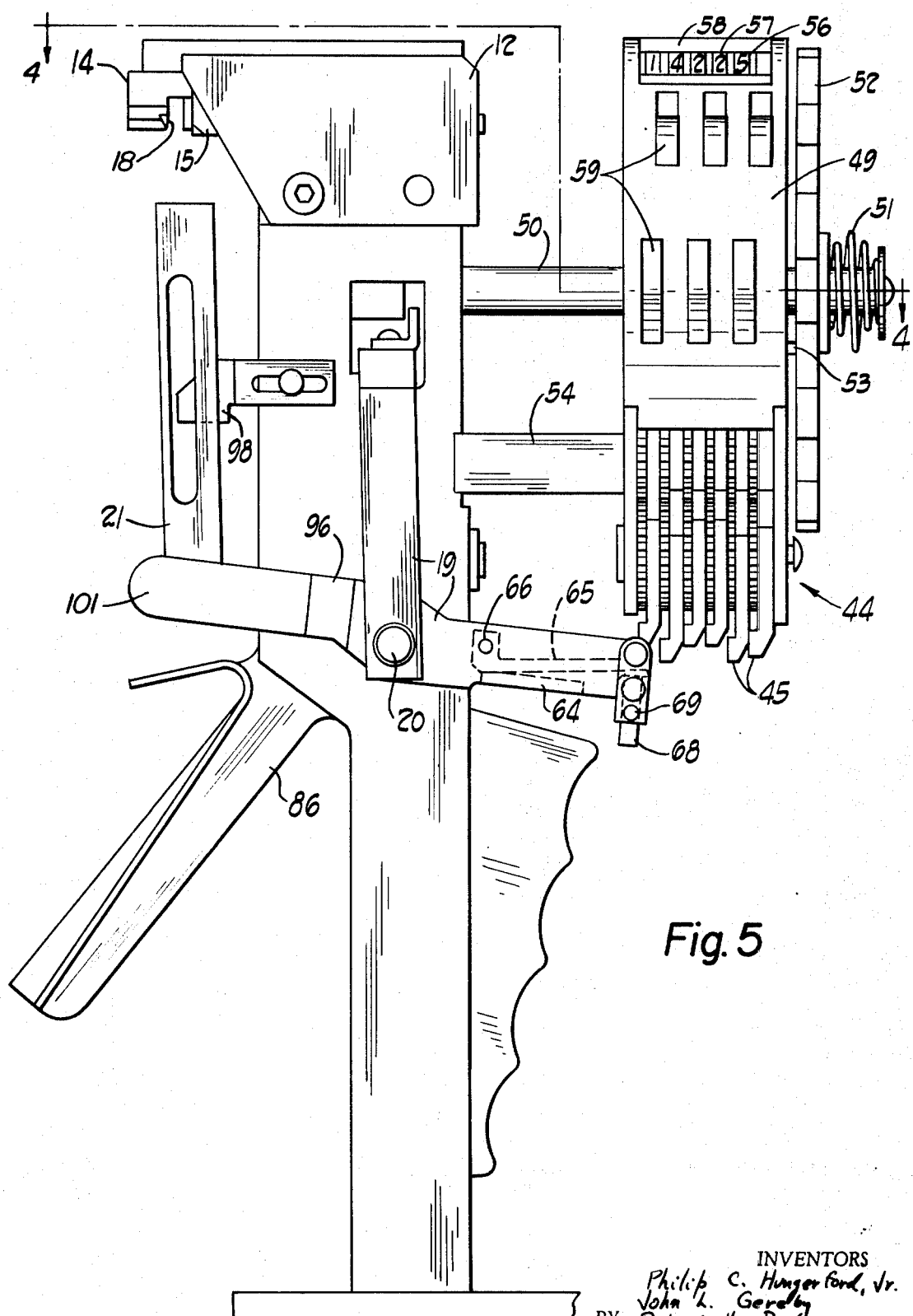
FIG. 5 is a right-side elevational view of the mechanism in the finish position; and, FIG. 6 is a front elevational view showing the machine in the finish position.

The depth of the cut as determined by the depth setting means 44 is transformed into lateral relative movement between the cutter 14 and the vise means 21. In this preferred embodiment it is accomplished by laterally moving the vise means 21. The parallelogram linkage 40 has a rearward extension 64 on which a plate 65 is pivotally mounted at 66. This plate 65 has a follower 67 which is an up-turned lip of the plate 65. This follower is adapted to follow the vertical height of each of the depth gauges 45. As will be noted from FIG. 2, a single-sided key 24 has a different vertical height from the double-sided key 26. To accomodate this difference in lateral dimension, a support piece 68 is pivoted on the plate 65. When the support piece 68 is pivoted to the vertical position as shown in FIG. 5, then the depth setting means 44 is properly set to cut single sided keys 24. When the support piece 68 is pivoted to a horizontal position shown in FIG. 1, the vise means 21 drops further away from the punch 14 and is in the proper position for cutting double-sided keys 26.

Cut spacing means 72 is provided to establish the spacing of the cuts or notches along the axial length of the key 24, 26. This cut spacing means includes a stepped plate 73 and an index arm 74. The cooperation between this stepped plate 73 and index arm 74 establishes the axial position of the punch 14 relative to the vise means 21. To this end the index arm 74 is adjustably fixed by screws 75 and 76 to the vise means 21. There are a series of seven different stepped plates 73 within the hollow gears 46 and each fixedly mounted generally radially in a different one of seven of the eight sectors in the drum 49. Each stepped plate has a series of steps 77 interconnected by risers 78. The series of steps 77 may be considered a series of spacing walls cooperable with the index arm 74. A carriage spring 79 surrounds axle 20 and acts between the frame 19 and the vise carriage 19 to urge same in the direction of the arrow 80 and thus the index arm 74 is urged against the appropriate one of the series of the spacing walls or the steps 77. To accomplish this successive cooperation with the individual steps 77, the drum 49 is indexed in a step fashion to the right as viewed in FIGS. 4 and 5, as described below. The appropriate one of the stepped plates 73 cooperates with index arm 74 depending upon which of the seven sectors of the gears 46 is selected to be operational. Each manufacturer in setting the specifications for its code may have a different axial spacing along the key for the successive notches. Accordingly, the individual stepped plates 73 will have the appropriate axial spacing between the successive steps 77. An initial step 81 may have a different dimension relative to the next adjacent step 77 than the spacing of all the rest of the steps on that plate. The reason for this is that again each manufacturer may set a different distance for the first cut relative to the shoulder or axial gauging surface on the key which engages shoulder 36 on the vise means 21.

The punch 14 is actuated by cut actuating means 84. This cut actuating means includes a first lever 85 and a second lever 86. The first lever 85 is pivoted at 87 and the second lever 86 is pivoted at the fixed pivot axle 20. The two levers are connected in series which limits the distance which each lever is required to arcuately move. The drum shaft 50 is slidably journalled in the frame 12 and is connected by a pivot connection 89 to the first lever 85. A pawl 90 is pivoted at 93 on the drum shaft 50 and is urged downwardly by a spring 91 into engagement with a ratchet plate 92 fixed in the drum 49. This provides indexing motion to the drum 49. Indexing means 94 includes the pawl 90 and ratchet plate 92 as well as the levers 85 and 86. Each time the lever 86 is actuated, this provides an indexing of the drum 49 with the consequence that the index arm 74 cooperates with the next adjacent step 77. This indexing means 94 is reponsive to movement of the cut actuating means 84 and actually is responsive to the return movement of the lever 85 under the urging of the punch spring 16.

OPERATION

Many manufacturers such as automobile manufacturers make millions of keys each year each according to a preset code. This code permits making an operative key for that lock without having the actual key, merely the code number. The particular automotive manufacturer would be designated on the indicia 57 and the scalloped wheel 52 may be rotated to the appropriate sector for that particular manufacturer. This brings into use the appropriate one of seven stepped plates 73 which will establish the proper initial step 81 and the proper stepped spacing walls or steps 77 for axially spacing the successive cuts along the length of the key 24 or 26.

The spring fingers 59 may next be actuated to incrementally engage the teeth of the gears 46 to move each of the gauge rings and attached gear to the appropriate depth gauge number. As an example, the gauge setting 14225 for a five notch key is indicated in the window 58 in FIG. 5. This rotates the gears 46, in this case five of the six gears with the sixth gear not being used, i.e., set for zero notch depth. If the key to be cut had six notches, then the sixth gear would be used. There is a 4:1 ratio between gears 46 and pinions 48, so the eight sectors on each gear correspond to one-half a revolution of each cam 47. This establishes a full range from minimum to maximum depth setting of each of the depth gauges 45. The depth gauge follower 67 is long in axial length to cooperate with each of these depth gauges 45 despite the axially changing position of this follower 67. FIGS. 1 and 2 show the start position of the drum assembly 49 and the vise means 21. The proper blank key is mounted in the first vise 22 in engagement with the lateral and longitudinal gauge means provided in such vise. The axial gauge is the shoulder on the key 24 engaging the shoulder 36. The lateral gauge is the rear-edge of the key 24 engaging the lower gauge surface 31. With the knob 30 tightened, the key 24 is ready to be cut. The first actuation of the cut actuating means lever 86 does not produce a cut, it merely moves the drum 49 axially to the left as viewed in FIG. 1. This will move the drum so that the index arm 74 drops off the initial step 81 onto the first of the series of the steps 77. This establishes the proper distance from the shoulder 36 for the first cut. The initial step 81 may be considered a "make ready" position and is actually an annular groove around the drum 49 in which the index arm 74 may reside to permit rotation of the entire set of gears 46 by means of the scalloped wheel 52.

Figure 4:
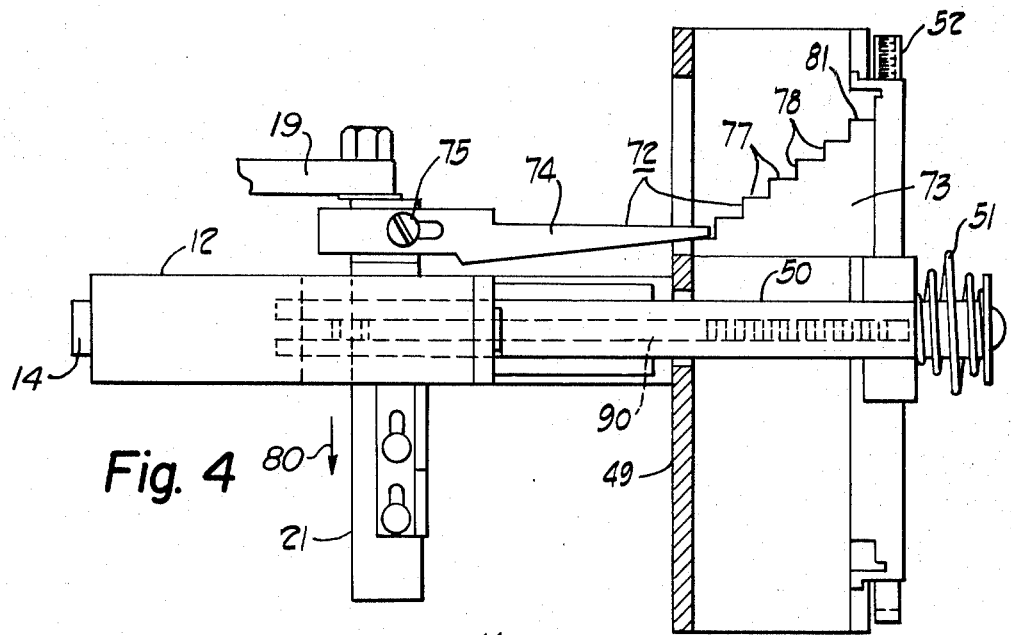
FIG. 4 is a partial sectional view taken on line 4—4 of FIG. 5.

Upon each actuation of the lever 86, the drum shaft 50 is moved slightly to the right, as viewed in FIG. 3, and thus the pawl 90 will move sequentially to the right to engage the next adjacent tooth in the ratchet plate 92. As the lever 86 is released, the stronger punch spring 16 overcomes the force of the drum spring 51 and the pawl 90 in engagement with the ratchet plate 92 moves the drum 49 one step to the left, viewed in FIG. 1. As shown in FIG. 4 there may be a slight separation between the end of the index arm 74 and the corresponding riser 78. This small space is taken up at the initial arcuate movement of lever 86 for each successive cut. The reason for the space is to assure that the pawl 90 will drop into the next adjacent tooth on the ratchet plate 92.

As the drum indexes along the drum shaft 50 from the start position of FIG. 1 to the finish position of FIG. 5, the depth setting means 44 changes the vertical position of the vise means 21 for each notch. When the drum has reached its finish position of FIG. 5, then further actuation of the machine 86 will not cut any more notches, because there are no more teeth on the ratchet plate 92, hence, the drum cannot index forward in an indexing direction.

Reset means is provided to reset the entire key cutting machine 11 to its start position of FIGS. 1, 2 and 3. This reset means is accomplished by the operator simply grasping the vise carriage 19 and moving it in a single direction. The lower parallelogram linkage 40 may act as a handle 101 or link to be grasped to move this vise means 21 in a direction opposite to the arrow 80. This is against the urging of the carriage spring 79. In such movement, the carriage 19 is moved upwardly as viewed in FIG. 4 and thus the drum 49 is no longer restrained by the end of the indexing arm 74 engaging the last riser 78.

As the vise carriage 19 is pushed completely to the start position of FIGS. 1, 2 and 3, a cam lug 99 on the vise carriage 19 enters a notch in the shaft 50 and raises the spring-loaded pawl 90, permitting the drum spring 51 to return the drum to the start position shown in FIGS. 1–3. At this time the vise carriage 19 is held in the start position by means of the index arm 74 being trapped by the initial step 81 on the stepped plate 73. The follower 67 on the pivoting plate 65 is cut away at 100, FIG. 6, to permit the drum 49 with the plural depth gauges 45 thereon to move back to the start position when the vise carriage 19 is reset by being pushed all the way to the left to the position of FIG. 2, opposite the operating or indexing direction 80. At the furthest left position the cam lug 99 trips the pawl 90 and causes the drum spring 51 to reset the drum. When the vise carriage 19 is released, the actual start position is slightly to the right of the reset position enabling the depth gauges 45 to move up onto the follower surface 67 of the pivoted plate 65, and enabling the cam lug 99 to move out of contact with the pawl 90, so it can begin to index the drum 49 for the first operation of the lever handle 86. This first operation of the lever 86 is not designed to make a cut, but only place the vise carriage 19 and the corresponding key blank 24, 26 in position for the first cut, which is then made on the second actuation of the lever 86. The key-cutting machine 11 is then conditioned for the next cycle of key-cutting. A second key may be cut identical to the first using the same code set at the indicia window 58. Alternatively, this code may be changed to cut a different key.

The key cutting machine 11 may be used not only for cutting a key in accordance with a manufacturer's code, but may also be used for duplicating a master key or owner's key. The master key may be clamped in the second vise 23 and the appropriate key blank clamped in the first vise 22. The scalloped wheel 52 is rotated to the key copying sector at which sector no stepped plate 73 is provided. In this sector all of the depth gauges 45 are raised the maximum amount toward the drum shaft 50 and this permits maximum freedom of movement vertically of the vise means 21. Also, without the spacing walls 77 being present, the index arm 74 is free to move back and forth axially of the length of the key. The carriage spring 79 is disabled by being compressed and a spring arm 95 maintains this spring compressed by being latched over the parallelogram linkage 19 at location 96. When these steps are accomplished, it is very easy for an operator to position the vise means 21 both laterally and longitudinally so that a stylus 98 fixed on the frame 12 is in engagement with a first notch on the master key 25. The lever 86 may then be actuated to cut a correspondingly laterally and axially positioned notch in the key blank 24. The operator may next move the vise in succession along all of the notches in the master key, actuating the lever 86 for each notch and thus duplicate the form of the master key on the key blank. It should be noted that if the customer's key is not necessarily an automotive or code cut key, it can still be traced in a suitable manner by moving the vise assembly 21 a small amount and nibbling out the proper shape of cut so that such cut matches the respective cut in the master key.

The key cutting machine described above is a hand-held and hand actuated key cutting machine moving a punch 14 against an anvil 15. This key cutting machine is a self-contained machine able to cut code set keys according to any usual manufacturer's code. There are no loose parts to be assembled in the proper position, and hence no loose parts that become lost. Once the code is set in the indicia window 58, the handle 86 may be squeezed in rapid fire succession and the key blank will be cut to the proper dimensions. The key cutting machine 11 automatically indexes along the length of the key by the indexing means 94 which includes the cut spacing means 72, the pawl 90, ratchet 92 and the lever handle 86. All functions are tied to the actuation of the handle 86, both the depth setting means 44 and the cut spacing means 72. The fact that the drum 49 moves in a direction perpendicular to the axial length of the key 24, permits use of the stepped plate 73. This stepped plate 73 establishes the axial spacing of the cuts along the key 24, and the depth setting means 44 is enabled in sequence to establish the proper lateral depth of cut for each of these axial positions along the key. Also this stepped plate 73 permits the reset means to be reset by only a single direction of movement by the operator of the vise means 21. The operator need move the vise means 21 only against the urging of the carriage spring 79 and the entire mechanism is reset, both the depth setting means and the cut spacing means. The parallelogram linkage 39, 40 establishes that the vise means 21 always maintains a constant planar attitude of the blank key relative to the key cutter 14. This is not true with pivoted carriages which do change the planar attitude as the depth of cut changes. This parallelogram linkage 39, 40 also permits the vise means 21 to have the second vise 23. This permits the key cutting machine 11 to act both as a key duplicating machine as well as a code set cutting machine.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A machine for cutting key blanks, comprising, in combination,
   a frame,
   a cutter,
   an indexable carriage movably mounted on said frame,
   vise means adapted to hold key means,
   said key means including a blank key for operation thereon by said cutter and having a longitudinal axis,
   means mounting one of said cutter and said vise means on said carriage and the other on said frame for relative longitudinal movement between said cutter and vise means,
   cut spacing means acting between said carriage and said frame to establish the spacing of successive cuts along the length of the blank key,
   said cut spacing means including a plurality of spacing walls carried on one of said carriage and said frame and acting on the other, cut actuating means to actuate one of said cutter and said vise means relative to the other to cut a notch in a blank key, and indexing means responsive to movement of said cut actuating means to index said carriage to the next selected spacing wall.

2. A machine as set forth in claim 1, wherein said cutter includes an anvil and a punch cooperable therewith.

3. A machine as set forth in claim 2, wherein said cut actuating means includes lever means connected to actuate said punch.

4. A machine as set forth in claim 2, including punch spring means urging said punch to an open position relative to said anvil.

5. A machine as set forth in claim 7, including lever means in said cut actuating means connected to actuate said punch against the urging of said punch spring means.

6. A machine as set forth in claim 1, wherein said cutter is mounted on said frame and said vise means is mounted on said carriage.

7. A machine as set forth in claim 1, wherein said plurality of spacing walls include a plurality of steps on a stepped plate, an indexing arm cooperable with said stepped plate, and said indexing means moves one of said indexing arm and said stepped plate relative to the other in a first direction to permit cooperation of said indexing arm with the next adjacent step for each successive indexing movement.

8. A machine as set forth in claim 1, including indexing spring means urging said carriage in a first direction relative to said frame, and said indexing means permitting movement of said carriage by said spring means.

9. A machine for cutting key blanks, comprising, in combination, a frame, a cutter, an indexable carriage movably mounted on said frame, vise means adapted to hold key means, said key means including a blank key for operation thereon by said cutter and having a longitudinal axis, means mounting one of said cutter and said vise means on said carriage and the other on said frame for relative longitudinal movement between said cutter and vise means, cut spacing means acting between said carriage and said frame to establish the spacing of successive cuts along the length of the blank key, indexing means to index said carriage in an indexing direction to the next selected one of said cut spacing means, and reset means connected to said carriage to reset said indexing means upon movement of said carriage in a direction opposite to said indexing direction.

10. A machine as set forth in claim 9, wherein said reset means includes a handle to move said carriage in a single direction.

11. A machine as set forth in claim 9, including cut spacing means, cut actuating means to actuate one of said cutter and said vise means relative to the other to cut a notch in a blank key, and said indexing means being responsive to said movement of said cut actuating means.

12. A machine as set forth in claim 9, including depth setting means establishing the depth of cut of said cutter laterally on a blank key, and said reset means movable in a single direction and resetting said depth setting means as well as said indexing means.

13. A machine for cutting key blanks, comprising, in combination, a frame, a cutter, vise means adapted to hold key means, said key means including a blank key for operation thereon by said cutter and having a longitudinal axis, an indexable carriage movably mounted on said frame, first means mounting one of said cutter and said vise means on said carriage and the other on said frame for relative longitudinal movement between said cutter and vise means, depth setting means establishing the depth of cut of said cutter laterally on a blank key, said depth setting means including a plurality of depth gauges, a follower cooperable with said depth gauges in succession, first means connecting one of said vise means and said cutter to move relative to each other in accordance with relative movement between said follower and said depth gauges to vary the depth of cut on a key blank, cut spacing means acting between said carriage and said frame to establish the spacing of successive cuts along the length of the blank key, said cut spacing means including a plurality of spacing walls carried on one of said carriage and said frame and acting on the other, cut actuating means to actuate one of said cutter and said vise means relative to the other to cut a notch in a blank key, and indexing means responsive to movement of said cut actuating means to index one of said depth gauges and follower relative to the other to the next selected depth gauge and to index said carriage in an indexing direction to the next selected spacing wall.

14. A machine as set forth in claim 13, wherein said first mounting means and said first connecting means includes mounting said vise means on said carriage to be movable both longitudinally and laterally with the lateral movement establishing the variable depth of cut on a key blank.

15. A machine as set forth in claim 13, wherein said first connecting means includes mounting said carriage to be movable both longitudinally and laterally with the lateral movement establishing the variable depth of cut on a key blank.

16. A machine as set forth in claim 13, wherein said plurality of spacing walls include a plurality of steps on a stepped plate, said stepped plate having a plurality of risers between each of said steps, and the distance between successive risers establishing cooperation of said cam follower with successive depth gauges during said indexing means relative movement.

17. A machine as set forth in claim 13, wherein said depth gauges and follower are relatively movable in a first path and said carriage is movable in a second path transverse thereto.

18. A machine as set forth in claim 13, including parallelogram linkage means mounting said vise means on said frame as part of said first connecting means.

19. A machine as set forth in claim 18, wherein said first mounting means mounts said vise means on said carriage, and said first connecting means includes means mounting said carriage on said parallelogram linkage means to move said key means laterally.

20. A machine as set forth in claim 19, including first and second vises on said carriage adapted for receiving a blank key and a master key, respectively.

21. A machine as set forth in claim 20, including gauge means in each of said vises to establish the longitudinal and lateral positions of each the blank and master keys.

22. A machine as set forth in claim 13, including parallelogram linkage means in said first connecting means mounting said carriage on said frame with movement of the parallelogram linkage means effecting lateral movements of said vise means, and a pivot axle fixedly mounted on said frame journalling said parallelogram linkage means for axial and rotative movements as part of said first mounting means with the axial movements providing longitudinal movement of said vise means.

23. A machine as set forth in claim 22, including lever means in said cut actuating means, and means pivotally mounting said lever means on said pivot axle.

24. A machine as set forth in claim 13, wherein said depth setting means includes a gear connected to rotate each of said plurality of depth gauges, and indicia connected to each of said gears.

25. A machine as set forth in claim 24, including a pinion gear meshing with each of said gears, and means to rotate each depth gauge from a respective pinion.

26. A machine as set forth in claim 24, wherein said indicia includes a gauge ring connected to each of said gears.

27. A machine as set forth in claim 24, including cam means to move said depth gauges.

28. A machine as set forth in claim 27, wherein each sector corresponds to one-half a revolution of said cam means.

29. A machine as set forth in claim 13, including cam means moving said depth gauges.

30. A machine as set forth in claim 13, including reset means connected to said carriage for movement thereof in a single direction to reset both said depth setting means and said cut spacing means to an initial position ready for a second cycle of cutting.

31. A machine as set forth in claim 30, wherein said reset means includes a link on said carriage operable to move said carriage in a direction opposite to the indexing direction.

32. A machine as set forth in claim 31, including a plurality of steps on a stepped plate as said spacing walls, an indexing arm cooperable with said stepped plate, and said reset means relatively moving said indexing arm and said stepped plate to an initial position.

33. A machine for cutting key blanks, comprising, in combination, a frame, a cutter, vise means adapted to hold key means, said vise means including first and second vises adapted for receiving a blank key and a master key, respectively, a stylus cooperable with a master key in the second vise, a carriage, parallelogram linkage means mounting said carriage on said frame, first means mounting one of said cutter and said vise means on said carriage and the other on said frame for relative longitudinal and lateral movement between said cutter and vise means, and first means connecting said vise means and said cutter for relative movement in accordance with relative movement between said stylus and said second vise to permit cooperation of said stylus and the master key in said second vise to relatively position a blank key in the first vise and said cutter to permit cutting said blank key in accordance with the shape of the master key.

34. A machine as set forth in claim 33, wherein said first mounting means includes means to mount said first vise on said carriage.

35. A machine as set forth in claim 33, wherein said first mounting means includes means to mount said second vise on said carriage.

36. A machine as set forth in claim 33, wherein said first mounting means includes means to mount both said first and second vises on said carriage, and said parallelogram linkage mounting of said carriage retaining the same planar attitude of said vise means relative to said cutter for all lateral positions of said vise means for the same attitude of cut despite variations in depth of cut.

37. A machine as set forth in claim 36, wherein said carriage may be longitudinally and laterally manipulated with the stylus in engagement with a master key to cut a blank key in accordance therewith.

* * * * *